May 8, 1945.  A. DE L. SINDEN  2,375,698
CONVEYER
Original Filed March 2, 1940

INVENTOR
ALFRED DE LOS SINDEN
BY J. Stanley Churchill.
ATTORNEY

Patented May 8, 1945

2,375,698

UNITED STATES PATENT OFFICE 2,375,698

CONVEYER

Alfred De Los Sinden, Aurora, Ill., assignor to Redler Conveyor Company, Quincy, Mass., a corporation of Massachusetts Original application March 2, 1940, Serial No. 321,968, now Patent No. 2,281,026, dated April 28, 1942. Divided and this application January 19, 1942, Serial No. 427,309

1 Claim. (Cl. 198—52)

This invention relates to a conveyer for conveying flowable solid material.

The object of the invention is to provide a novel and improved construction of conveyer which finds particular use in conveying lumpy materials and with which the liability of jamming the conveyer and injuring the component parts thereof is reduced to a minimum.

With this general object in view, and such others as may hereinafter appear, the invention consists in the conveyer and in the various structures, arrangements and combinations of parts hereinafter described and particularly defined in the claim at the end of this specification.

Figure 1:
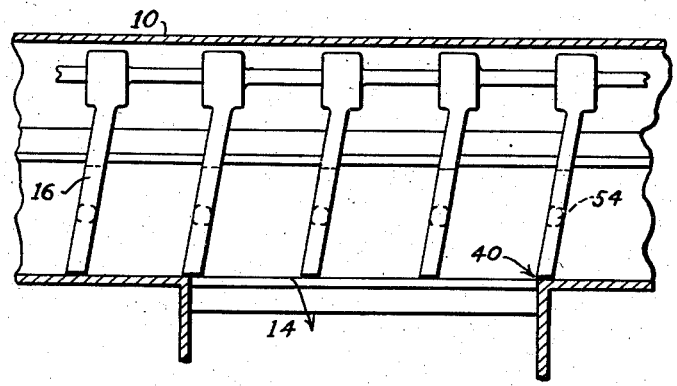
Figure 2:
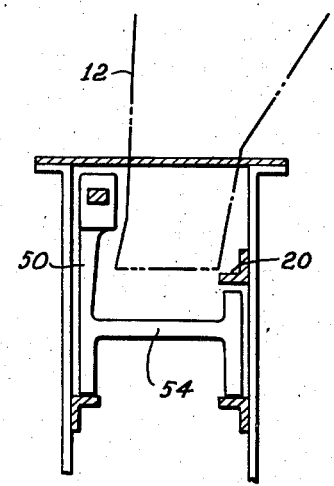

In the drawing illustrating the preferred embodiment of the invention, Fig. 1 is a longitudinal section; and Fig. 2 is a cross-section of a conveyer embodying the present invention.

Prior to the present invention substantial difficulty has been encountered in handling certain types of lumpy flowable material in conveyers of the type embodying an elongated casing and a conveying element having spaced flights adapted to be drawn therethrough. Among such material may be mentioned crushed stone, coal, and other material containing lumps of a hardness such that, when wedged between the flights of the conveyer and the sharp edge of the conveyer casing forming the rear edge of the inlet or discharge opening therein, the flights oftentimes become broken or bent, or the conveyer stalled and rendered inoperative. The present invention contemplates novel and improved structures of the conveyer at the inlet and discharge sections thereof and different features of the invention find particular use in conveyers of the open flight type such as form the subject matter of the Redler United States Reissue Patent No. 18,445, while other features of the invention are particularly useful in connection with conveyers of the solid flight type, such for example as illustrated in the United States patent to White No. 2,066,866.

Referring to the drawing, 10 represents a casing of a conveyer of the type referred to which is provided with an inlet chute 12 through which material is introduced into the casing 10 to be conveyed therethrough by a conveyer element made up of a plurality of flexibly connected flights 16. The flights 16 are of the open type comprising two upright side legs 50, 52 and a cross-bar 54 connecting the side legs at a substantial distance above the bottom of the legs. One leg 52 is substantially shorter than the other leg 50 so that during normal operation of the conveyer the level of the material is disposed substantially below the pivotal connection between the flights. The casing is also provided with a discharge outlet 14 and the disposition of the cross-bar 54 substantially above the lower portion of the legs 50, 52 avoids the liability of jamming lumps of the material being conveyed between the cross-bar and the edge 40 of the discharge opening.

In order to prevent the material as it is introduced into the casing through the inlet chute 12 from entering into the pivotal connections between successive flights, the end of the discharge chute 12 is arranged to terminate substantially below the level of the pivotal connections connecting the upper ends of each of the longer legs of the flights within and adjacent the top wall of the casing, as illustrated in Fig. 2. The chute also terminates immediately above the shorter legs 52 of the flight, and a cover member 20 is provided upon one adjacent side wall of the casing arranged to extend immediately over the upper end of the shorter leg 52 in order to prevent the direct entrance of material between the shorter legs and the side wall of the casing as the material leaves the inlet chute 12.

This application is a division of my co-pending application, Serial No. 321,968, filed March 2, 1940, and issued April 28, 1942, as Patent No. 2,281,026.

Having thus described the invention, what is claimed is:

In a conveyer, a substantially horizontal casing provided with top, bottom and side walls and a discharge opening in the bottom wall, a conveyer element adapted to be drawn through the casing comprising a plurality of H-shaped open flights, each having one of its vertical legs of substantially greater length than the other, adjacent flights being pivotally connected together at the upper end of their longer vertical legs, said flights being of a size to dispose said pivotal connections within and adjacent the top wall of the casing, said H-shaped flights being constructed to dispose the cross-bar a substantial distance above the bottom of the casing whereby to prevent jamming of lumpy material between the cross-bar and the rear edge of the discharge opening in the bottom wall of the casing, an inlet chute extended down into the casing a substantial distance below said pivotal connections and at one side of said longer vertical legs and terminating slightly above the shorter legs thereof, and a cover carried by the side wall of the casing and extended immediately over the shorter legs for preventing direct entrance of material between said shorter legs and the side wall of the casing.

ALFRED DE LOS SINDEN.